US007765358B2

(12) United States Patent
Rutherford, III et al.

(10) Patent No.: US 7,765,358 B2
(45) Date of Patent: Jul. 27, 2010

(54) CONNECTING MULTIPLE PERIPHERAL INTERFACES INTO ONE ATTACHMENT POINT

(75) Inventors: William A. Rutherford, III, Denver, CO (US); Scott M. Rockwell, Centennial, CO (US); Joerg Stohrer, Heiningen (DE)

(73) Assignee: Quantum Corporation, San Jose, CA (US)

( * ) Notice: Subject to any disclaimer, the term of this patent is extended or adjusted under 35 U.S.C. 154(b) by 30 days.

(21) Appl. No.: 12/108,358

(22) Filed: Apr. 23, 2008

(65) Prior Publication Data

US 2009/0271556 A1  Oct. 29, 2009

(51) Int. Cl.
*G06F 13/00* (2006.01)

(52) U.S. Cl. ...................... 710/316; 439/166
(58) Field of Classification Search ................. 710/316; 439/49, 166
See application file for complete search history.

(56) References Cited

U.S. PATENT DOCUMENTS

| | | | | |
|---|---|---|---|---|
| 5,469,545 | A * | 11/1995 | Vanbuskirk et al. | 709/234 |
| 7,457,902 | B2 * | 11/2008 | Yang et al. | 710/200 |
| 2007/0165660 | A1 * | 7/2007 | Fang et al. | 370/410 |
| 2008/0313658 | A1 * | 12/2008 | Cagno et al. | 719/326 |

OTHER PUBLICATIONS

Anonymous. (Jun. 2005). "RTSASR-12X: 12-Port Serial Attached SCSI (SAS) Edge Expander Operating Manual, Version 1.0d," Rancho Technology, Inc.: Rancho Cucamonga, CA, located at <http://www.rancho.com/DataSheets/RTSASR-12XM.pdf>, last visited on Sep. 12, 2008, 12 pages.
Anonymous. (Sep. 11, 2008). "Serial Attached SCSI," located at <http://www.en.wikipedia.org/wiki/Serial_Attached_SCSI>, last visited on Sep. 12, 2008, 7 pages.

* cited by examiner

*Primary Examiner*—Glenn A Auve
(74) *Attorney, Agent, or Firm*—Baker Botts L.L.P.

(57) ABSTRACT

An interconnect apparatus is provided for connecting at least one peripheral device to a multi-channel interface. The apparatus includes an incoming connector having a first incoming channel connector and at least one second incoming channel connector, wherein the incoming connector is operable to detachably connect to an interface cable, a first outgoing connector having a first outgoing channel connector, at least one second outgoing connector having at least one second outgoing channel connector, and routing logic operable to propagate a first signal between the first incoming channel connector and the first outgoing channel connector, and to propagate at least one second signal between the at least one second incoming channel connector and the at least one second outgoing channel connector; wherein a position of the first outgoing channel connector in the first outgoing connector corresponds to a position of the at least one second outgoing channel connector in the at least one second outgoing connector.

25 Claims, 6 Drawing Sheets

CONNECTING MULTIPLE PERIPHERAL INTERFACES INTO ONE ATTACHMENT POINT

BACKGROUND

1. Field

The present invention relates generally to connecting peripherals to host computers, and more specifically to connecting a multiple-channel connector of a host or expander to a plurality of peripheral devices.

2. Related Art

Serial Attached SCSI (SAS) is a storage interface for transferring data between a host computer and peripheral devices such as hard drives, optical drives, tape drives, scanners, and the like. The devices are ordinarily connected to the computer by a cable, where one end of the cable plugs into a SAS port connector on the computer, or into an interface module that communicates with the computer. The other end of the cable plugs into an SAS port connector on the peripheral device. Each SAS port connector may include multiple channels, and each channel may include one or more conducting strips or pins. The cable connects the strips or pins of an interface connector or port on the computer or interface module to the corresponding sockets or pins of an interface connector or port on the peripheral device. The pins may be metallic protrusions, metallic surfaces on a printed circuit board, or the like. Sockets accept the pins when the cable is connected to the connector or port. The SAS protocol uses SCSI (Small Computer System Interface) commands transmitted via high-speed serial communication.

The host computer is referred to as an "initiator" because it initiates commands and data transfer operations. The peripheral device is referred to as a target, and receives the commands. The target includes at least one port that in turn includes connection points, and also includes one or more storage devices, e.g., hard disks or tape drives, on which the data is stored. The target device writes the data received from the initiator on the storage device(s), and reads data requested by the initiator from the storage device(s).

Interconnection of devices with host systems, and interconnection of SAS devices, are known in the art. Host-bus adapters, e.g., interface cards for use in a personal computer, may have an SAS interface port. A host-bus adapter may have, for example, one connector that includes channels or "lanes" for multiple devices to communicate with the host in parallel. There may be, for example, four channels in each connector. Connectors may have fewer channels, e.g., two channels, or more channels, e.g., eight or sixteen channels per connector. The connector may interface with the device via a cable, where the cable connects each of the channels to a corresponding portion of a port connector on the device. Existing SCSI parallel technology may use direct attachment via a cable or daisy-chaining via a sequence of cables to connect multiple tape drives to a host computer. However, direct-attachment is relatively expensive and daisy-chaining involves risks such as of shutting down the entire chain if the first peripheral device needs replacement.

Existing SAS expanders may perform packet switching to route data from the host to the peripheral devices. The peripheral devices may be SAS initiators or targets. SAS expanders may locate an end device directly, using a physical connection e.g., via a cable, or using a routing table to direct packets of data to the end device. SAS expanders are, however, relatively bulky, expensive, and use rack space and AC power. Furthermore, existing SAS cables and expanders connect multi-channel host-bus interface connectors to multi-channel peripheral connectors. However, some peripherals have single-channel connectors that are incompatible with the multi-channel device connectors of existing SAS cables and expanders.

SUMMARY

A fan-out interconnect device converts from a multiple-channel "incoming" host connector configuration having, for example, four channel connectors, in which each channel connector propagates data and/or commands of a particular channel to a corresponding single-channel "outgoing" plug connector, e.g., one of four single-channel connectors corresponding to the four channels of the host connector. Note that the terms "incoming" and "outgoing" are used to distinguish the two different connectors, and do not limit the direction in which data and/or commands may be propagated. Each channel may represent multiple physical wires or lines, with corresponding connection points in the incoming host connector and in the outgoing plug connector. A connection point may be, for example, an electrically conductive strip on printed circuit board, or a conductive strip in an edge connector socket, or a conductive pin, or a socket for receiving the pin.

The single-channel outgoing plug connector format is useful, for example, for connecting peripheral devices, such as storage devices, which do not have multi-channel connectors, but do have single-channel connectors, to the host connector. The interconnect device has an incoming connector for connecting to a host interface and multiple (e.g., 4) outgoing plug connectors that may connect each channel of the host interface to a different peripheral device. In one example, each of the outgoing plug connectors is compatible with a single-channel peripheral device. That is, one channel selected from the multiple-channel incoming host connector is routed to a corresponding channel connector in the outgoing plug connector, e.g., one of the four channel connectors in a four-channel plug. The other channel connectors of each outgoing plug connector may be unused. Furthermore, in one example, the position of the corresponding channel connector in each outgoing plug connector is the same in each outgoing plug connector. For example, each channel of the incoming host connector may be routed to the first (e.g., lowest numbered) channel in the pinout of an outgoing plug connector that corresponds to the channel, to accommodate single-channel peripherals that communicate with the first channel in the connector pinout. The connectors may be, for example, Serial Attached SCSI (SAS) or mini-SAS connectors to which SAS interconnect cables may be connected. Multiple embodiments of the interconnect device are described herein.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 1:
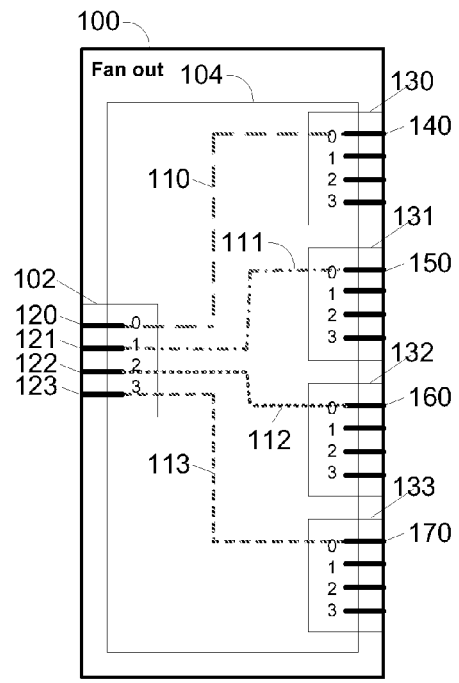
FIG. 1 illustrates a fan-out interconnect device in accordance with embodiments of the invention.

FIG. 1 illustrates a fan-out interconnect device in accordance with embodiments of the invention. The fan-out interconnect device 100 converts from a multiple-channel connector format used by an incoming connector 102, in which each channel connector 120, 121, 122, 123 propagates channel data, to a format having multiple single-channel plug connectors 130, 131, 132, 133, in which one channel connector 140, 150, 160, 170 of each plug connector 130, 131, 132, 133 propagates channel data to and from a corresponding channel connector 120, 121, 122, 123, respectively. The single-channel plug connector format is useful, for example, with peripheral devices, such as storage devices that do not use multi-channel connections, but do use single-channel connections. That is, one channel connector 140 of each plug connector 130 is used to connect to a single-channel storage device interface, where the channel connector 140 receives signals from a first incoming channel connector 120 of the incoming connector 102, and the other three channel connectors of each plug connector 130 are not used. In one example, the connectors are Serial Attached SCSI (SAS) or mini-SAS connectors to which SAS interconnect cables may be connected.

Although FIG. 1 shows four channels with four corresponding incoming channel connectors 120, 121, 122, 123 and four corresponding outgoing channel connectors 130, 131, 132, 133, the interconnect device 100 may be adapted to any number of channels by adding or removing channel connectors in the incoming connector 102. In one example, outgoing connectors and links may be added or removed so that the number of outgoing connectors matches the number of channels in the incoming connector 102. In other examples, there may be more or fewer outgoing connectors than channels in the incoming connector. In still other examples, there may be more than one incoming connector.

The fan-out interconnect device 100 includes routing logic 104 that connects or maps signals between the incoming connector 102 and the outgoing connectors 140, 150, 160, 170. Note that the terms "incoming" and "outgoing" are used to distinguish the two different connectors, and do not limit the direction in which data may flow. That is, the incoming and outgoing connectors may both be used to send and receive data. The interconnect device 100 may be used in one example to connect or interface a host-bus adapter to storage devices, and in another example to connect any multiple-channel bus to single-channel devices.

In one example, the operation of the routing logic 104 is illustrated in FIG. 1 by links 110, 111, 112, 113. The routing logic 104 may be, for example, wires, cables, or a printed circuit. The first link 110 connects a first incoming channel 120 (channel 0) of the incoming connector 102 to a first outgoing channel 140 (channel 0) of a first outgoing connector 130. The second link 111 connects a second incoming channel 121 (channel 1) of the incoming connector 102 to a first outgoing channel 150 (channel 0) of a second outgoing connector 131. The third link 112 connects a third incoming channel 122 (channel 2) of the incoming connector 102 to a first outgoing channel 160 (channel 0) of a third outgoing connector 132. The fourth link 113 connects a fourth incoming channel 123 (channel 3) of the incoming connector 102 to a first outgoing channel 170 (channel 0) of a fourth outgoing connector 133. In one example, the second and subsequent channel connectors (e.g., the connectors for channels 1-3) of the outgoing connectors 130, 131, 132, 133 are not used and may be grounded or left unconnected.

Figure 2:
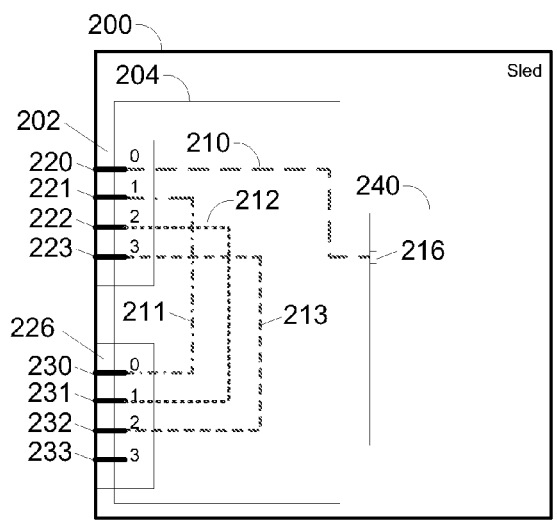
FIG. 2 illustrates a sled-based interconnect device in accordance with embodiments of the invention.

FIG. 2 illustrates a sled-based interconnect device in accordance with embodiments of the invention. The sled-based interconnect device 200 includes an incoming connector 202 and shift logic 204 that maps signals from the incoming connector 202 to an outgoing connector 226. The shift logic 204 may be, for example, wires, cables, or a printed circuit. The operation of the shift logic 204 is shown in FIG. 2 as four links, where the first link 210 connects the first incoming channel connector 220 (channel 0) to an interface port 216 of a storage device 240. The second and subsequent links connect the second and subsequent incoming channel connectors 221, 222, 223 using a one-to-one mapping to the first and subsequent outgoing channel connectors 230, 231, 232, respectively, where there is no need to establish a connection to the fourth outgoing channel connector 233.

Figure 3:
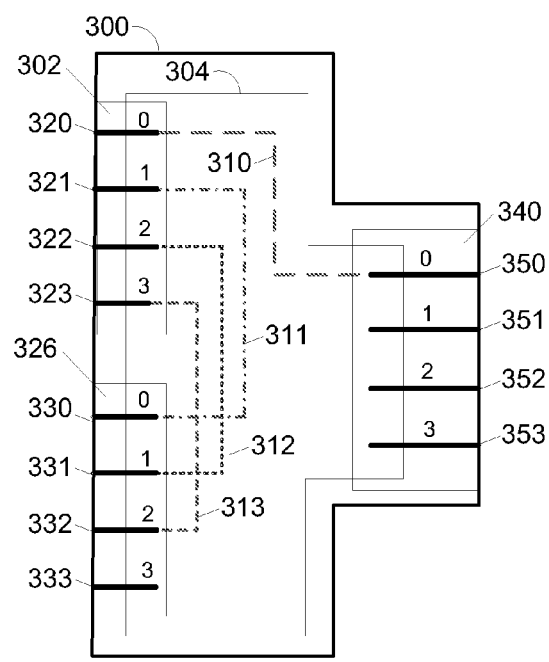
FIG. 3 illustrates an interconnect adapter in accordance with embodiments of the invention.

FIG. 3 illustrates an interconnect adapter in accordance with embodiments of the invention. The interconnect adapter 300 has an incoming connector 302, a daisy-chain connector 326, and an outgoing connector 340. The interconnect adapter 300 connects a first incoming channel connector 320 (e.g., channel 0) of the incoming connector 302 to a first channel 350 (e.g., channel 0) of the outgoing connector 340, and connects the second and subsequent incoming channel connectors 321, 322, 323 (e.g., channels 1-3) of the incoming connector 302 to daisy-chain channel connectors 330, 331, 332 of the daisy-chain connector 326, where the channel connectors 330, 331, 332 in the daisy-chain connector 326 are in positions shifted backwards (e.g., from 1 to 0, from 2 to 1, and from 3 to 2), so that the incoming channel connectors 321, 322, 323 (e.g., channels 1-3) are connected to the daisy-chain channel connectors 330, 331, 332 (e.g., channels 0-2). That is, the daisy-chain channel connectors 330, 331, 332 corresponding to the signals of the second and subsequent incoming channel connectors 321, 322, 323 (channels 1-3) are positioned in the daisy-chain connector 326 starting at the position 330 in the daisy-chain connector that corresponds to the position of the first incoming channel connector 320 in the incoming connector. If an order is imposed on incoming channel connectors 320, 321, 322, 323 in the incoming connector 302, where the first incoming channel connector 320 is the first channel connector in the order, and the second and subsequent incoming channel connectors 321, 322, 323 are the second and subsequent channel connectors in the order, the adapter device transfers signals between the first incoming channel connector 320 and the outgoing channel connector 350, and transfers signals between the second incoming channel connector 321 and the associated daisy chain channel connector 330, wherein the position of the daisy chain channel connector 330 in the daisy chain connector 326 corresponds to a position of a preceding incoming channel connector 320 in the incoming connector 302, and the preceding incoming channel connector 320 precedes the second incoming channel connector 321 associated with the daisy chain channel connector 330 in the order by a predetermined number, e.g., 1, of channel connectors.

In another example, the interconnect adapter 300 is capable of connecting one or more single-channel storage devices to a multi-channel data transfer interface. The adapter 300 includes a first link 310 from a first incoming channel connector 320 to first outgoing channel connector 350, where the first outgoing channel connector 350 is located at a first position in the outgoing connector 340, e.g., a selected metallic finger or pin. The links may be, for example, wires, cables, printed circuits, or the like. The adapter 300 also includes a second link 311 from a second incoming channel connector 321 to first daisy chain channel connector 330, a third link 312 from a third incoming channel connector 322 to a second daisy chain channel connector 331, and a fourth link 313 from a fourth incoming channel connector 323 to a third daisy chain channel connector 332. In other examples, more or fewer channel connectors may be present. For example, to support a single channel, the first and second incoming channel connectors may be present, with a link from the first channel connector 320 to the outgoing channel connector 350, and a link from the second incoming channel connector 321 to the first daisy-chain channel connector. If more than four channels are to be supported, an additional input channel connector and daisy-chain channel connector may be added for each additional channel to be supported, with an additional link between the additional channel connectors. Furthermore, in one example, the first 320, second 321, third 322, and fourth 323 incoming channel connectors are arranged in consecutive order in the incoming connector 302 starting at a first position (e.g., the position of the first incoming channel connector 320) in the incoming connector 302. Similarly, in one example, the first 330, second 331, and third 332 daisy chain connectors are arranged in consecutive order in the daisy chain connector 326 starting at a first position (e.g., the position of the first daisy chain channel connector 330) in the daisy chain connector 326, and the positions of the first 320, second 321, third 322, and fourth 323 incoming channel connectors in the incoming connector 302 correspond to the positions of the first 330, second 331, third 332, and fourth 333 daisy-chain channel connectors in the daisy-chain connector 326. That is, in one example, the incoming channel connectors 302 have the same physical pinout as the daisy chain channel connectors 326, with the channels that correspond to the second and subsequent incoming channel connectors mapped to the first and subsequent (up to N−1) daisy-chain channel connectors 326, and the channel that corresponds to the first incoming channel connector 320 mapped to the first outgoing channel connector 350.

In one example, the connections are established by shift logic 304, which may include links implemented by, for example, electrical wires or a printed circuit. A first channel link 310 connects a first incoming channel connector 320 to a first outgoing channel connector 350. A second channel link 310 connects a second incoming channel connector 321 to a first daisy-chain channel connector 330. A third channel link 312 connects a third incoming channel connector 322 to a second daisy-chain channel connector 331. A fourth channel link 313 connects a fourth incoming channel connector 323 to a third outgoing daisy-chain channel connector 332. A fourth outgoing daisy-chain channel connector 333 is not connected, since there are no further channels to pass on to the next adapter 300 in the chain. The connector 333 may therefore be grounded, left unconnected, omitted, or the like.

Figure 4:
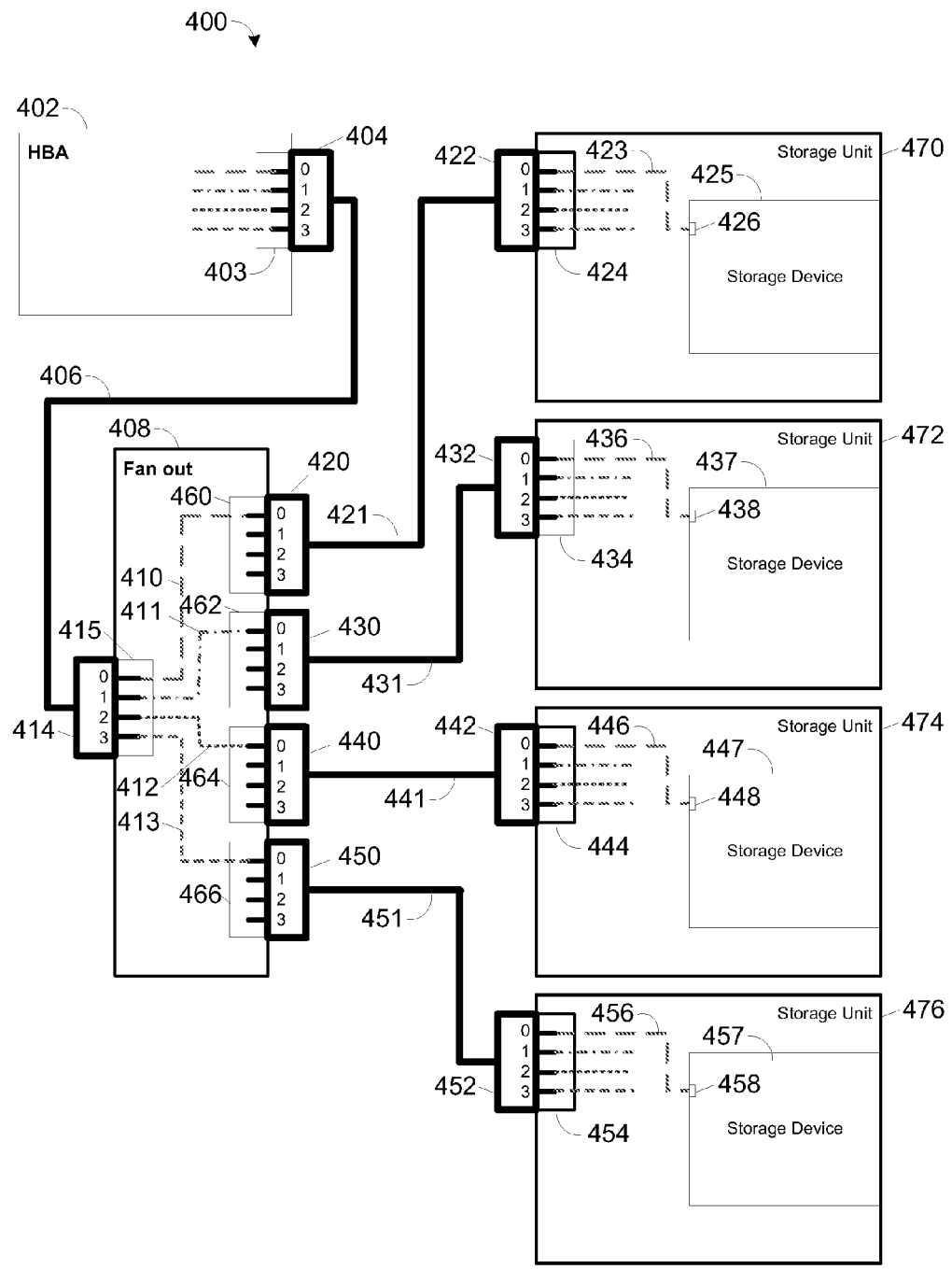
FIG. 4 illustrates a storage system using the fan out device in accordance with embodiments of the invention.

FIG. 4 illustrates a storage system using the fan out device in accordance with embodiments of the invention. The storage system 400 includes a fan-out interconnect device 408, a host-bus adapter (HBA) 402, a cable 406 for connecting a multi-channel connector 403 of the host-bus adapter 402 to the fan-out device 408, and cables 421, 431, 441, 451 for connecting the fan-out device 408 to interface connectors 424, 434, 444, 454 of data storage units 470, 472, 474, 476. The data storage units may be, for example, SAS peripheral device enclosures (i.e., sleds) that accept storage devices such as tape drives, disk drives, optical drives, or Flash-memory based storage devices. FIG. 4 shows storage devices 425, 437, 447, 457, e.g., tape drives, in the data storage units 470, 472, 474, 476, respectively. Note that although four storage units are shown in the example of FIG. 4, any number of storage units may be used by adapting the fan-out interconnect device 408 as described above with respect to FIG. 1.

The fan-out device 408 propagates electrical signals that carry SAS protocol operations and data between an incoming connector 415 and outgoing connectors 460, 462, 464, 466, where each channel in the incoming connector is propagated to one of the outgoing connectors. Each channel may be transmitted or propagated on multiple lines, e.g., wires. For example, SAS uses two transmit wires and two receive wires for each channel. A connector such as the incoming connector 415 has a connection point for each wire. A connection point may be, for example, an electrically conductive strip on printed circuit board, or a conductive strip in an edge connector socket for receiving another conductive strip, or a conductive pin, or a socket for receiving a pin. Connectors such as the incoming connector 415 may include one or more transmit connection points and one or more receive connection points, where each transmit connection point is associated with a corresponding receive connection point to define a channel for transmitting and receiving control commands and data. Referring to FIG. 1, although the connection points are not shown individually, each channel connector, such as the first incoming channel connector 120, includes multiple connection points, and the connection points of a channel connector 120 physically touch or interact with corresponding connection points of a plug 414 when the plug 414 is inserted into the connector 415. Note that the terms "plug" and "connector" refer to two objects that can be connected to each other to establish electrical conductivity between connection points of a cable and connection points of a connector on a device.

Any suitable type of plug and connector may be used. The plugs 420, 430, 440, 450 of the cables 421, 431, 441, 451 also plug into the connectors of the fan-out device 408, and the cable plugs 422, 432, 442, 452 plug in to the connectors 424, 434, 444, 454 of the storage units 470, 472, 474, 476. The cable plugs 404, 420, 430, 440, 450 may be, for example, SFF-8088 or SFF-8470 plugs. The cable plugs 422, 432, 442, 452 may be, for example, SFF-8088 or SFF-8470 plugs.

The host-bus adapter 402 includes a connector 403 that connects to a detachable host adapter cable plug 404. The connector 403 includes multiple channels, e.g., SAS lanes, for communicating with multiple data storage units 470, 472, 474, 476, one device per channel. In one example, each of the storage devices 425, 437, 447, 457 has one single-channel interface ports 426, 438, 448, 458. Therefore, a simple extension cable that expands the host-bus adapter's multi-channel connector 403 into multiple multi-channel connectors cannot be connected directly to multiple identically-configured storage devices. An adapter in the form of a wire or equivalent connecting the appropriate outgoing channel connector to the corresponding storage device may be used to establish the connections, but such an approach involves a different circuit configuration in each of the four storage units (e.g., sleds) 470, 472, 474, 476. Similarly, a switch or similar configurable connector could be used in each of the four sleds, but the proper switch setting would have to be selected for each of the four storage units, which introduces additional complexity and may lead to configuration errors. The fan-out device 408 provides for connection of the single-channel storage units 470, 472, 474, 476 to the multi-channel connector 403 using a simple circuit, i.e., the wires 423, 436, 446, 456, in each storage unit, with the same circuit being used in each storage unit. Other interconnect devices described herein provide for connection of single-channel storage units to a multi-channel connector 404 using a single circuit configuration for each storage unit. Note that the term "connect" is used herein to refer to any type of interface that allows signals to be propagated between two endpoints, and may include temporary or logical connections in addition to or as alternatives to physical connections.

The fan-out device 408 maps or connects each of the four channel connectors, numbered 0, 1, 2, 3 in FIG. 4, of the incoming connector 415 to an outgoing channel connector, numbered 0 in each outgoing connector 460, 462, 464, 466. That is, each channel in the incoming connector 415 is mapped to a different outgoing connector 460, 462, 464, 466, and the positions of the channel connectors in the outgoing connector are the same in all outgoing connectors. A channel connector's position is, for example, the positions of the connection points that make up the channel connector. If the connection points are conductive strips on a board, then the position of the connection point corresponds to the positions of the conductive strips on the board, e.g., the second channel in a connector may correspond to the fourth, fifth, sixth, and seventh strips on a top portion of the connector, where the numbering is established by, for example, an industry standard or by counting from an edge of the connector. Similarly, if the connectors use pins, the position of the channel in the connector corresponds to the pin numbers that carry signals for that channel. Note that the term "connection point" as used herein refers to a feature of a connector such as a conductive strip or a pin.

The fan-out device 408 may perform the mapping or connection of the corresponding connectors using a simple wire or a wire connection on a printed circuit board, or may use a circuit or processor to establish the connections. The connections are represented in FIG. 4 as links 410, 411, 412, 413. A first link 410 connects a first incoming channel connector (numbered 0) of the incoming connector 415 to a first outgoing channel connector (numbered 0) of a first outgoing connector 460. A second link 411 connects a second incoming channel connector (numbered 1) of the incoming connector 415 to a first outgoing channel connector (numbered 0) of a second outgoing channel connector 462. A third link 412 connects a third incoming channel connector (numbered 2) of the incoming connector 415 to a first outgoing channel connector (numbered 0) of a third outgoing channel connector 464. A fourth link 413 connects a fourth incoming channel connector (numbered 3) of the incoming connector 415 to a first outgoing channel connector (numbered 0) of a fourth outgoing channel connector 466.

Figure 5:
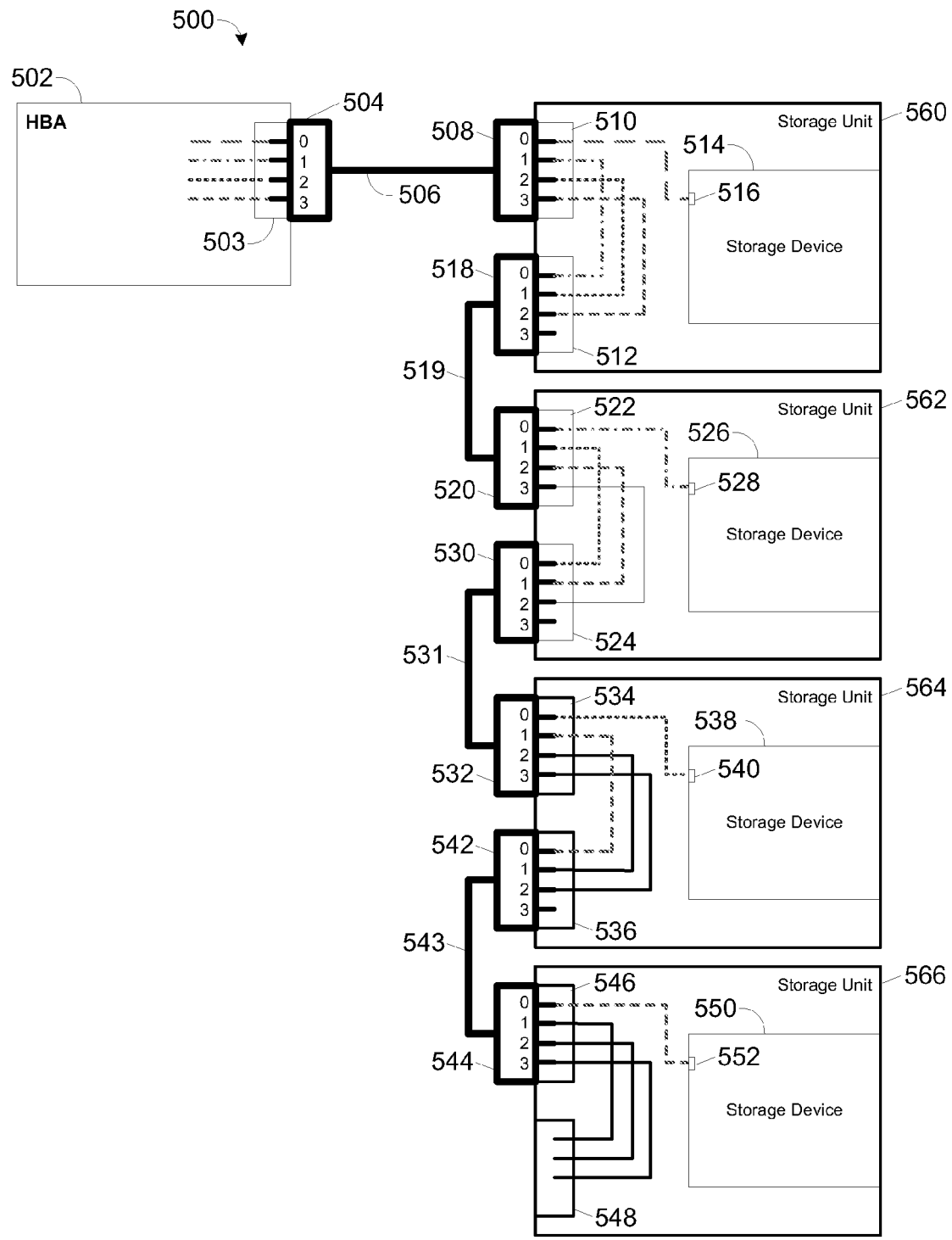
FIG. 5 illustrates a storage system using a sled-based interconnection device in accordance with embodiments of the invention.

FIG. 5 illustrates a storage system using a sled-based interconnection device in accordance with embodiments of the invention. The storage system 500 interfaces a host-bus adapter (HBA) 502 to four storage devices 514, 526, 538, 500, which are, for example, SAS tape drives. A first cable 506, e.g., an SAS interlink cable, connects a multi-channel connector 503 of the host-bus adapter 502 to a first incoming connector 510 of a first storage unit 560. The plug that connects to the first incoming connector 510 may be, for example, an SFF-8088. The host connector 503 is a 4-channel connector in the example of FIG. 5, but the storage devices 514, 526, 538, 550 have single-channel interface ports 516, 528, 540, 552, respectively. Each storage unit 560, 562, 564, 566 includes a sled-based interconnect device, which is, in this example, a circuit included in the storage unit housing. The sled-based interconnect device connects a first incoming channel connector (e.g., channel 0) of an incoming connector 510 to the interface port 516 of the storage device 514, and connects the second and subsequent incoming channels connectors (e.g., channels 1-3) of the incoming connector 510 to outgoing channel connectors of an outgoing connector 5128, where the outgoing channel connectors are in positions shifted backwards (e.g., from 1 to 0, from 2 to 1, and from 3 to 2), so that the incoming channel connector 0 is connected to the storage device 514, and the incoming channel connectors 1-3 are connected to the outgoing channel connectors 0-2. That is, the outgoing channel connectors are positioned in the outgoing connector 512 starting at the number of the first incoming channel connector (channel 0). A multi-channel cable 519, referred to herein as a daisy chain cable because it is used in a daisy chain configuration, connects the outgoing connector 512 to an incoming connector 522 of the second storage unit 562 so that the second host channel is fed into the second storage unit 562 in the position of the first channel in the incoming connector 522. The plugs 520, 532, 544 may be, for example, SFF-8470 plugs. The plugs 504, 518, 530, 542 may be, for example, SFF-8088 plugs.

The storage units 562, 564, 566 also use the same circuit, thereby connecting the first channel (channel 0) of the host-bus adapter 502 to the interface port 516 of the first tape drive 514, connecting the second channel (channel 1) to the interface port 528 of the second tape drive 526, connecting the third channel (channel 2) to the interface port 540 of the third tape drive 538, and connecting the fourth channel (channel 3) to the interface port 552 of the fourth tape drive 550. A multi-channel daisy chain cable 531 connects the second storage unit 562 to the third storage unit 564, and another multi-channel daisy chain cable 543 connects the third storage unit 564 to the fourth storage unit 566. No cable is attached to the outgoing connector 548 of the fourth storage unit 566 because all four channels have been allocated to the four storage units. In other examples, for a host interface 502 that has more than four channels, more than four storage units may be used, in which case an additional cable would be used for each additional storage unit. Similarly, for fewer than four channels, fewer than four storage units could be used.

Figure 6:
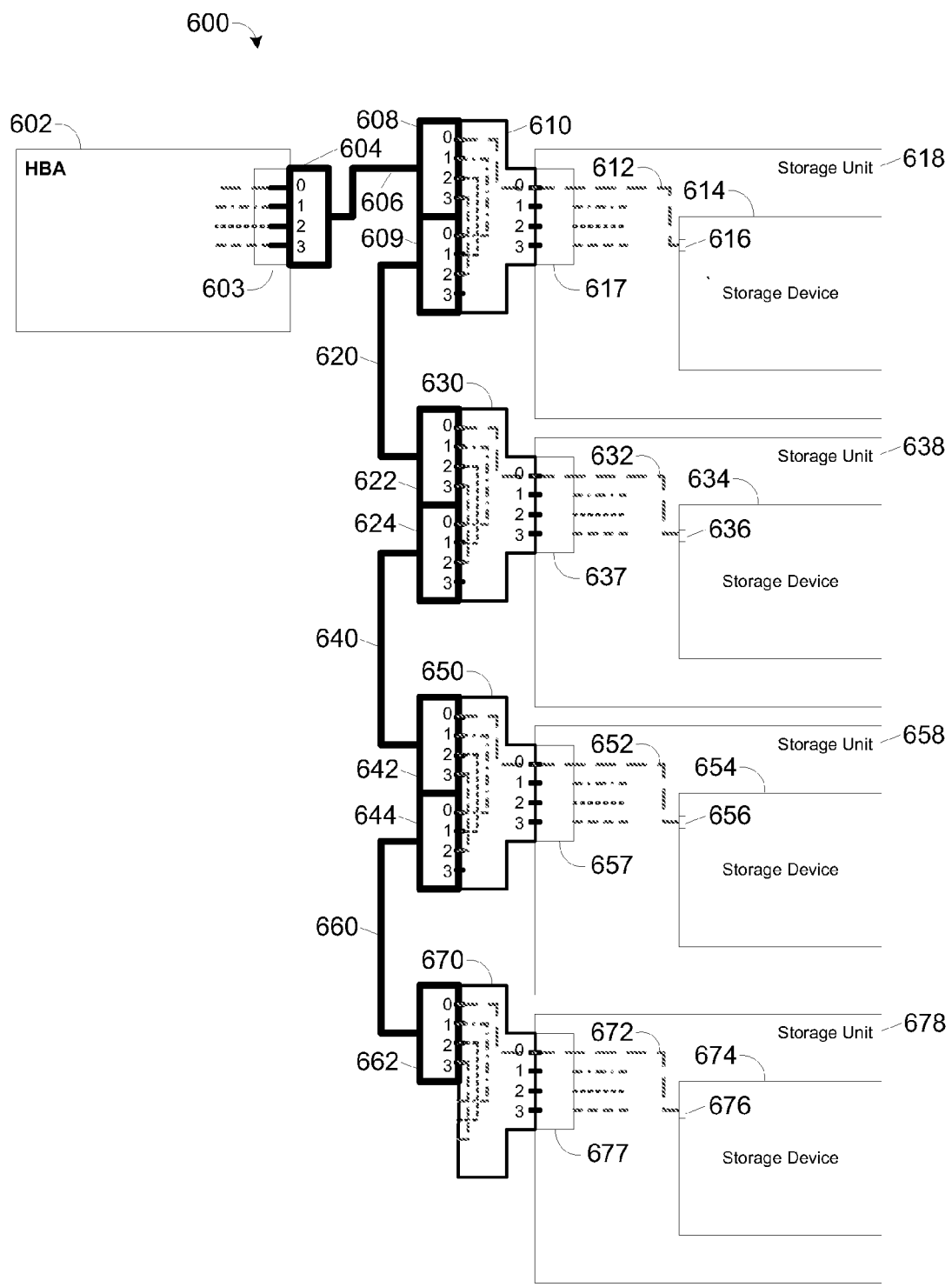
FIG. 6 illustrates a storage system using interconnect adapters in accordance with embodiments of the invention.

FIG. 6 illustrates a storage system using interconnect adapters in accordance with embodiments of the invention. The storage system 600 uses an interconnect adapter device to interface a host-bus adapter 602 to four storage devices 614, 634, 654, 674, which are, for example, SAS tape drives. A first cable 606, e.g., an SAS interlink cable, connects a multi-channel connector of the host-bus adapter 602 to an incoming connector of an interconnect adapter 610. The cable 606 connects between a multi-channel connector 603 of the host-bus adapter 602 using a plug 604, which may be, for example, an SFF-8470 plug, and connects to the interconnect adapter 610 using a plug 608, which may be, for example, an SFF-8088 plug. The multi-channel host connector 603 is a 4-channel connector in the example of FIG. 5, but the storage devices 614, 634, 654, 674 have single-channel interface ports 616, 636, 656, 676, respectively.

Each storage unit 618, 638, 658, 678 includes a respective incoming connector 617, 637, 657, 677. Referring to the storage unit 618 as a representative example, a wire or circuit 612 in the storage unit 618 connects a first incoming channel connector (e.g., channel 0) of an incoming connector 617 to the interface port 616 of the storage device 614.

An interconnect adapter 610 is similar to the interconnect adapter 300 described above with respect to FIG. 3. A multi-channel cable 620, referred to herein as a daisy chain cable because it is used in a daisy chain configuration, connects the daisy-chain connector (shown as 326 in FIG. 3) to an incoming connector of a second interconnect adapter 630, so that the second channel of the host-bus adapter 602 is fed into the second storage unit 638 in the position of the first channel in the incoming connector. The cable 620 connects to the daisy-chain connector of the adapter 610 using a plug 609, and connects to the incoming connector of the adapter 630 using a plug 622.

The adapters 630, 650, 670 use the same circuit as the first adapter 610. The first adapter 610 connects the first channel (channel 0) of the host-bus adapter 602 to the first incoming channel connector (channel 0) of the incoming connector 617, which is simply connected to the interface port 616 of the first storage device 614. The first adapter thus consumes the signal from the first channel of the host-bus adapter 602 by passing the first signal to the storage unit 618, and passes the remaining channels to the second adapter 630, shifting the remaining channels to the position of the first channel in the connector pinout or layout.

The second adapter 630 connects the channel signal received on the first incoming channel connector (channel 0), but since the signal received on channel 0 is actually the signal on channel 1 of the host-bus adapter 602 (i.e., signal 1), the adapter 630 feeds signal 1 to the interface port 636 of the second storage device 634. The second adapter 630 also feeds the signals received on its second and third incoming channel connectors (now signals 2 and 3) to the first and second input channels (0 and 1) of the third adapter 650. The third adapter 650 then feeds the signal on its first incoming channel connector (channel 0), which is signal 2, to the interface port 656 of the third storage device 654. The third adapter 650 thus consumes the third channel (channel 2) of the host-bus adapter 602, and passes the remaining channel to the fourth adapter.

The cable 640 connects to the daisy-chain connector of the adapter 630 using a plug 624, and connects to the incoming connector of the adapter 650 using a plug 642. Similarly, the cable 660 connects to the daisy-chain connector of the adapter 650 using a plug 644, and connects to the incoming connector of the adapter 670 using a plug 662. The plugs 604, 609, 624, 644, 608, 622, 642, 662 may be, for example, SFF-8088 plugs.

Figure 7A:
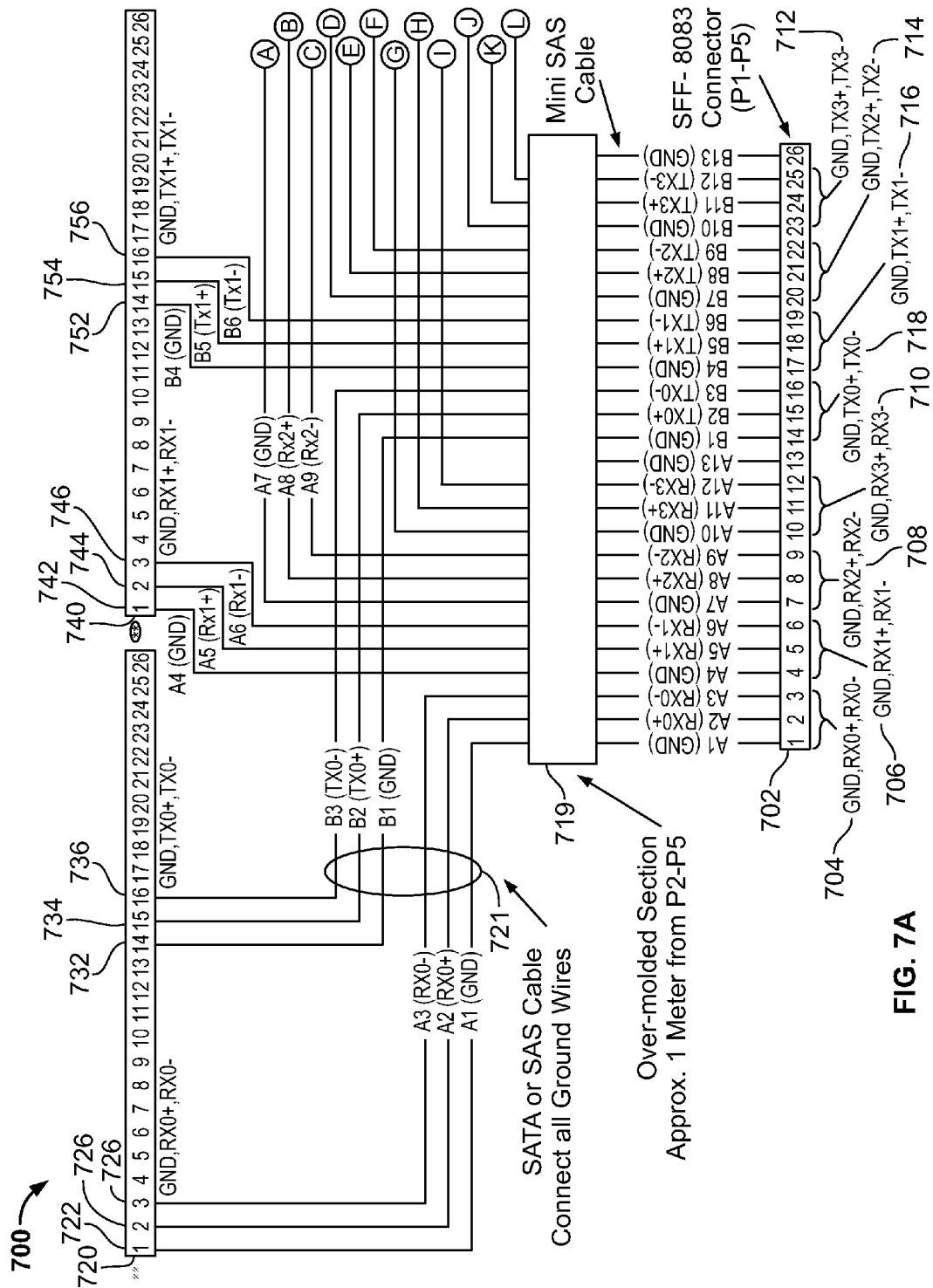
FIGS. 7A and 7B illustrate an interconnect cable in accordance with embodiments of the invention.
Figure 7B:
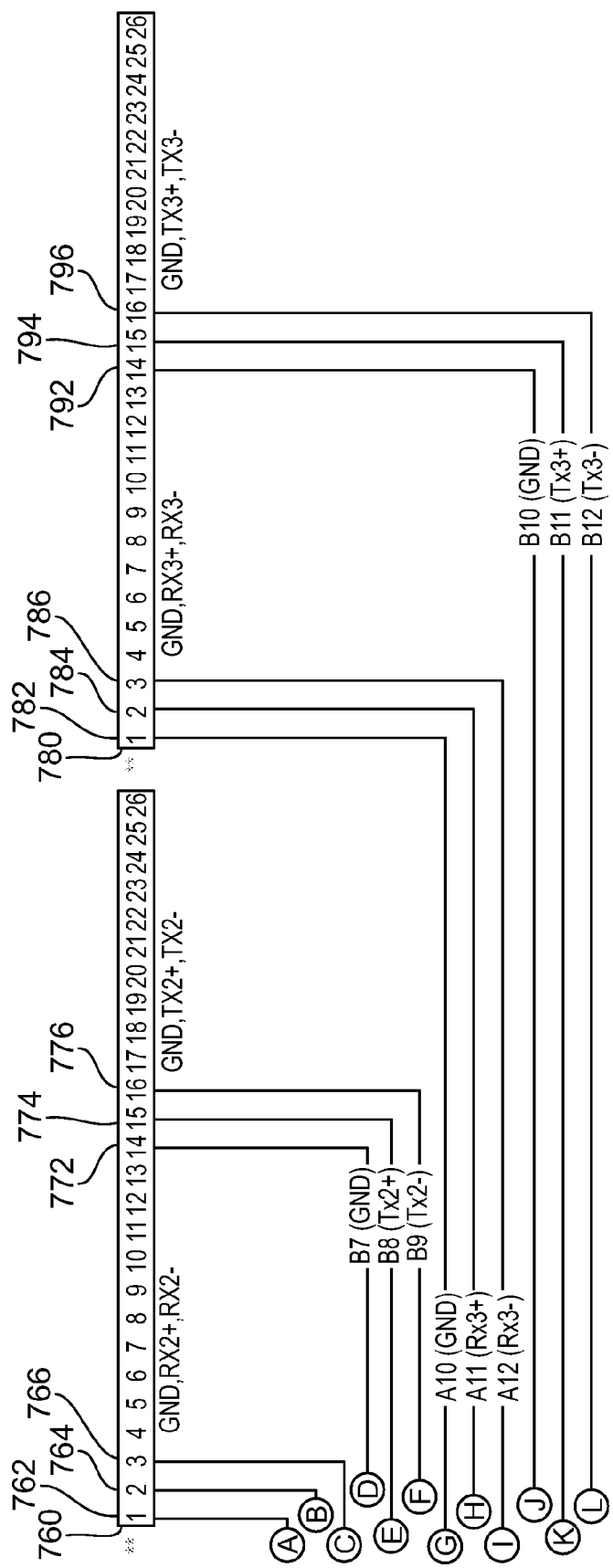

FIGS. 7A and 7B illustrate an interconnect cable in accordance with embodiments of the invention.

The cable has an incoming connector, P1 that has four channel connectors (designated channels 0-3), and four outgoing connectors, each with connection points for four channels (where the connection points that correspond to the location of the first channel, i.e., channel 0, in each connector, are connected by the cable to an incoming channel connector that is located in a position in the incoming connector P1 that corresponds to the number or position of the outgoing connector in the cable. That is, channel 0 of the incoming connector is connected to channel 0 of a first outgoing connector, channel 1 of the incoming connector is connected to channel 0 of a second outgoing connector, channel 2 of the incoming connector is connected to channel 0 of a third outgoing connector, and channel 3 of the incoming connector is connected to channel 0 of a fourth outgoing connector.

The pinout configuration of the outgoing connector 720, e.g., the positions of the pins or metal strips in the connector 720, is the same as the pinout configuration of other three outgoing connectors 740, 760, 780. The pins are also referred to herein as connection points. Note that the terms incoming and outgoing are not meant to restrict the direction of data flow, and are used herein to create a distinction for descriptive purposes. The first three pins 722, 724, 728 of the connector 720 (starting from the left of the connector as shown) are the GND, RX0+, and RX0−(receive) pins of the first channel. The pins 732, 734, 736 are the GND, TX0+, and TX0−(transmit) pins of the first channel. Note that the pins of a channel need not be physically adjacent in the pinout configuration. Although one ground (GND) pin is shown and described for each receive (RX) and transmit (TX) pair, in other examples a first ground (GND) pin may be associated with the (RX+, TX−) pair, and second ground pin may be associated with the (RX−, TX−) pair by, for example, splitting the ground wire and connecting the resulting two ground wires to the two ground pins for each RX, TX pair. The pins for each channel would then be labeled as GND, RX+, TX+ and GND, RX−, TX−, where RX and TX denote each of RX0, RX1, RX2, RX3 and TX0, TX1, TX2, TX3, respectively, and a GND pin is associated with each TX, RX pair, in one example.

The pinout configuration of the second connector 740 includes receive pins 742, 744, 746 for the second channel, and transmit pins 752, 754, 756 for the second channel. The positions of the receive pins 724, 744, 746 of channel 1 in the second connector 740 correspond to the positions of the receive pins 722, 724, 726 of channel 0 in the first connector. In one example, the positions of the receive pins 742, 744, 746 of channel 1 in the second connector 740 are the same as the positions of the receive pins 722, 724, 726 in the first connector 720. That is, the pins 722, 724, 726 of the first channel in the first connector 720 and the pins 742, 744, 746 of the second connector 740 are in the same position relative to their respective connectors 720, 740. Similarly, the transmit pins 732, 734, 736 of the first channel's first connector 720 are in the same positions in the connector 720 as the transmit pins of the second channel in the connector 740. Furthermore, the pins (transmit and receive) 762, 764, 766, 772, 774, 776 of the third channel in the third connector 760 are in the same positions in the connector 760 as the transmit and receive pins of the first channel in the first connector 720, and, similarly, the pins (transmit and receive) 782, 784, 786, 792, 794, 796 of the fourth channel in the fourth connector 780 are in the same positions as the transmit and receive pins of the first channel in the first connector 720.

The cable 720 has an incoming connector 702 that includes pins for four channels. In other examples, the connector 702 may include pins for a different number of channels, e.g., 2, 3, or 8, and so on. The channels may be numbered 0, 1, 2, and 3, and may also be referred to as the first, second, third, and fourth channels, respectively. Each channel in the connector 702 includes three receive pins (a ground pin, a positive pin, and a negative pin) and three transmit pins (a ground pin, a positive pin, and a negative pin). The pins include channel 0 receive pins 704, channel 1 receive pins 706, channel 2 receive pins 708, channel 3 receive pins 710, channel 0 transmit pins 718, channel 1 transmit pins 716, channel 2 transmit pins 714, and channel 3 transmit pins 712. In one example, the cable 720 is a bundle of smaller cables or wires surrounded by an over-molded section 719. The wires connect the incoming first channel pins (GND, RX0+, RX0−) 704, (GND, TX0+, TX0−) 718 to outgoing first channel pins GND 722, RX0+ 724, RX0− 726, GND 732, TX0+ 734, TX0− 736 of the first outgoing connector 720. The outgoing first channel pins 722, 724, 726, 732, 734, 736 are in the position of the channel 0 pins in the pinout of the connector 720, so that a peripheral, e.g., a storage device, that accepts a single channel, e.g., channel 0, may be used with the connector 720, and the outgoing channel pins of the connectors 740, 760, 780 are also in the position of the channel 0 pins in their respective connectors, so that peripherals that accept a single channel may be used with the respective connectors For the second channel, the wires connect the incoming second channel pins (GND, RX1+, RX1−) 706, (GND, TX1+, TX1−) 716 to outgoing "first" channel pins GND 742, RX1+ 744, RX1− 746, GND 752, TX1+ 754, TX1− 756 of the second outgoing connector 740, where "first" refers to the position of the pins for channel 0. That is, the signals received on the second channel of the incoming connector 702 have been routed to the pins for channel 0 of the second outgoing connector 740. The third and fourth channels of the incoming connector 702 are similarly routed to the "first" channel pins of the third and fourth outgoing connectors 760, 780. For the third channel, the wires connect the incoming third channel pins (GND, RX2+, RX2−) 708, (GND, TX2+, TX2−) 714 to outgoing third channel pins GND 762, RX2+ 764, RX2− 766, GND 772, TX2+ 774, TX2− 776 of the third outgoing connector 760 For the fourth channel, the wires connect the incoming fourth channel pins (GND, RX3+, RX3−) 710, (GND, TX3+, TX3−) 712 to outgoing fourth channel pins GND 728, RX3+ 784, RX3− 786, GND 792, TX3+ 794, TX3− 796 of the fourth outgoing connector 780.

The connectors 720, 740, 760, 780, 702 may be any type of connectors, e.g., connectors having the pins arranged in a single row, or having the pins arranged in multiple rows, and may be, for example, SFF-8088 or SFF-8470 connectors, or the like.

Other designs, arrangements, and dispositions of various components discussed above are contemplated. In other examples, for a host interface 602 that has more than four channels, more than four storage units may be used, in which case an additional cable would be used for each additional storage unit. Similarly, for fewer than four channels, fewer than four storage units may be used.

Similarly, one of ordinary skill in the art would be able to effect further changes to the adapters 610, 630, 650, 670. For example, the signal to be sent to the storage device port 616 may be located an outgoing channel connector other than the first (channel 0) connector. In one example, the signal may be transmitted via the second channel connector (channel 1), third channel connector (channel 2), fourth channel connector (channel 3), or a combination thereof, on the adapters 610, 630, 650, 670.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An interconnect apparatus for connecting at least one peripheral device to a multi-channel interface, the apparatus comprising:

an incoming connector having a first incoming channel connector and at least one second incoming channel connector, wherein the incoming connector is operable to detachably connect to an interface cable;

a first outgoing connector having a first outgoing channel connector;

at least one second outgoing connector having at least one second outgoing channel connector; and routing logic operable to propagate a first signal between the first incoming channel connector and the first outgoing channel connector, and to propagate at least one second signal between the at least one second incoming channel connector and the at least one second outgoing channel connector, wherein a position of the first outgoing channel connector in the first outgoing connector corresponds to a position of the at least one second outgoing channel connector in the at least one second outgoing connector.

2. The apparatus of claim 1, wherein the position of the at least one second outgoing channel connector in the at least one second outgoing connector is the same as the position of the first outgoing channel connector in the first outgoing connector.

3. The apparatus of claim 1, wherein the first outgoing channel connector is positioned as the first channel connector in the first outgoing connector, and the at least one second outgoing channel connector is positioned as the first channel connector in the at least one second outgoing connector.

4. The apparatus of claim 1, wherein the multi-channel interface comprises Serial Attached SCSI, and the incoming connector and the at least two outgoing connectors comprise Serial Attached SCSI connectors, the first incoming channel connector and the first outgoing channel connector each correspond to an SAS lane, and the at least one second incoming channel connector and the at least one second outgoing channel connector each correspond to at least one SAS lane.

5. The apparatus of claim 1, wherein the first incoming channel connector, the at least one second incoming channel connector, the first outgoing channel connector, and the at least one second outgoing channel connector each comprise at least one connection point.

6. The apparatus of claim 5, wherein the at least one connection point comprises at least one transmit connection point and at least one receive connection point.

7. The apparatus of claim 5, wherein the at least one connection point comprises an electrical conductor, a socket for receiving an electrical connector, or a combination thereof.

8. The apparatus of claim 5, wherein the at least one connection point comprises a conductive strip on a printed circuit board, an edge connector socket for receiving the conductive strip, or a combination thereof 9. The apparatus of claim 5, wherein the at least one connection point comprises an electrically conductive pin, a socket for receiving the conductive pin, or a combination thereof.

10. The apparatus of claim 1, wherein the first and second signals comprises electrical signals of the Serial Attached SCSI protocol.

11. An interconnect cable comprising the interconnect apparatus of claim 1.

12. The apparatus of claim 1, further comprising:
a first storage unit operable to receive a first storage device, the first storage unit comprising:
a first storage unit connector having a first storage unit channel connector, wherein the first storage unit is operable to connect the first storage unit channel connector to an interface port of the first storage device;
at least one second storage unit operable to receive at least one second storage device, the at least one second storage unit comprising:
at least one second storage unit connector having at least one second storage unit channel connector, wherein the at least one second storage unit is operable to connect the at least one second storage unit channel connector to at least one interface port of the at least one second storage device,
wherein a position of the at least one second storage unit channel in the at least one second storage unit connector corresponds to a position of the first storage unit channel in the first storage unit connector;
a first interconnect cable operable to connect the first outgoing connector to the first storage unit connector, thereby connecting the first outgoing channel connector to the first storage unit channel connector; and
at least one second interconnect cable operable to connect the at least one second
outgoing connector to the at least one second storage unit connector, thereby connecting the at least one second outgoing channel connector to the at least one second storage unit channel connector.

13. An interconnect apparatus for connecting at least one peripheral device to a multi-channel interface, comprising:
an incoming connector having at least two incoming channel connectors, including a first incoming channel connector and at least one second incoming channel connector,
an outgoing connector having at least one outgoing channel connector;
wherein the incoming connector and the outgoing connector are each operable to detachably connect to an interface cable;
drive interface logic operable to transfer data between the first incoming channel connector and a storage device, and further operable to transfer data between the at least one second incoming channel connector and the at least one outgoing channel connector,
wherein the at least two incoming channel connectors are arranged in a numerical order in the incoming connector, the first incoming channel connector is the first connector in the numerical order, and the at least one second incoming channel connector comprises at least the second channel connector in the numerical order,
wherein the at least one outgoing channel connector is arranged in a numerical order in the outgoing connector; and
signal shift logic operable to transfer signals between the first incoming channel connector and the storage device, and to transfer signals between the at least one second channel connector and the at least one outgoing channel connector,
wherein each one of the at least one second incoming channel connector corresponds to a different one of the at least one outgoing channel connector, such that for each corresponding pair of the second incoming channel connector and the outgoing channel connector, the second incoming channel connector having a first position in the incoming connector, and the outgoing channel connector having a second position in the outgoing connector, the first position and the second position differ by a predetermined number.

14. The apparatus of claim 13, wherein the position of the at least one outgoing channel connector in the outgoing connector is the same as the position of at least one preceding channel connector in the incoming connector.

15. The apparatus of claim 13, wherein the predetermined number of channel connectors is 1.

16. The apparatus of claim 13, wherein the first incoming channel connector, the at least one second incoming channel connector, and the at least one outgoing channel connector each comprise at least one connection point.

17. The apparatus of claim 13, wherein the first incoming channel connector, the at least one second incoming channel connector, and the at least one outgoing channel connector each comprises a Serial Attached SCSI connector.

18. The apparatus of claim 13, wherein the peripheral device comprises a tape drive having a Serial Attached SCSI interface.

19. A storage unit comprising the apparatus of claim 13.

20. An interconnect apparatus for connecting at least one peripheral device to a multi-channel interface, the interconnect apparatus comprising:
- an incoming connector having a plurality of incoming channel connectors, including a first incoming channel connector, a second incoming channel connector, a third incoming channel connector, and a fourth incoming channel connector;
- an outgoing connector having an outgoing channel connector located at a defined position in the outgoing connector;
- a daisy chain connector having a plurality of daisy chain channel connectors, including a first daisy chain channel connector, a second daisy chain channel connector, a third daisy chain channel connector, and a fourth daisy chain channel connector;
- a first link from the first incoming channel connector to the outgoing channel connector;
- a second link from the second incoming channel connector to the first daisy chain channel connector;
- a third link from the third incoming channel connector to the second daisy chain channel connector;
- a fourth link from the fourth incoming channel connector to the third daisy chain channel connector;
- wherein the first, second, third, and fourth incoming channel connectors are arranged in consecutive order in the incoming connector starting at a first position in the incoming connector,
- the first, second, and third daisy chain channel connectors are arranged in consecutive order in the daisy chain connector starting at a first position in the daisy chain connector, and
- positions of the second, third, and fourth incoming channel connectors in the incoming connector correspond to positions of the first, second, and third, daisy chain channel connectors, respectively, in the daisy-chain connector.

21. An interconnect apparatus for connecting at least one peripheral device to a multi-channel interface, comprising:
- an incoming connector having a plurality of channel connectors, including a first incoming channel connector and at least one second incoming channel connector;
- an outgoing connector having an outgoing channel connector located at a defined position in the outgoing connector;
- a daisy chain connector having at least one daisy chain channel connector,
- wherein the plurality of channel connectors is arranged in an order in the incoming connector, the first incoming channel connector is the first channel in the order, and the at least one second incoming channel connector comprises at least the second channel in the order,
- wherein the at least one outgoing channel connector is arranged in a numerical order in the outgoing connector; and
- signal shift logic operable to transfer signals between the first incoming channel connector and the outgoing channel connector, and to transfer signals between the at least one second incoming channel connector and the at least one daisy chain channel connector,
- wherein each one of the at least one second incoming channel connector corresponds to a different one of the at least one outgoing channel connector, such that for each corresponding pair of the second incoming channel connector and the outgoing channel connector, the second incoming channel connector having a first position in the incoming connector, and the outgoing channel connector having a second position in the outgoing connector, the first position and the second position differ by a predetermined number.

22. The apparatus of claim 21, wherein the defined position is the first channel connector in the outgoing connector.

23. The apparatus of claim 21, wherein the position of the at least one daisy chain channel connector in the daisy chain connector is the same as the position of the at least one preceding channel connector in the incoming connector.

24. A data storage and retrieval system comprising:
- a first storage unit having a first storage unit channel connector;
- at least one second storage unit having at least one second storage unit channel connector;
- wherein a pinout configuration of the first storage unit channel connector is the same as a pinout configuration of the at least one second storage unit channel connector, and
- an interconnect cable comprising:
  - an incoming connector having a first incoming channel connector and at least one second incoming channel connector,
  - a first outgoing connector having a first outgoing channel connector,
  - at least one second outgoing connector having at least one second outgoing channel connector,
  - wherein a connector type of the first outgoing connector matches a connector type of the at least one second outgoing channel connector; and
  - routing logic operable to propagate a first signal between the first incoming channel connector and the first outgoing channel connector, and to propagate at least one second signal between the at least one second incoming channel connector and the at least one second outgoing channel connector,
  - wherein a position of the first outgoing channel connector in the first outgoing connector corresponds to a position of the at least one second outgoing channel connector in the at least one second outgoing connector, and
- wherein the interconnect cable is operable to connect the first incoming channel connector to a first host channel of a host bus adapter, and thereby to connect the first host channel to the first storage unit connector, and
- further operable to connect the at least one second incoming channel connector to at least one second host channel of the host bus adapter, and thereby to connect the at least one second host channel to the at least one second storage unit connector.

25. The apparatus of claim 24, wherein the position of the at least one second outgoing channel connector in the at least one second outgoing connector is the same as the position of the first outgoing channel connector in the first outgoing connector.

* * * * *